United States Patent
Fenn

(10) Patent No.: US 11,004,162 B2
(45) Date of Patent: *May 11, 2021

(54) SYSTEMS AND METHODS FOR FACILITATING REAL ESTATE TRANSACTIONS WITH PURCHASE OFFER PROCESSING FEATURE

(71) Applicant: MLS Offers LLC, Las Vegas, NV (US)

(72) Inventor: Alan J. Fenn, Las Vegas, NV (US)

(73) Assignee: MLS Offers LLC, Las Vegas, NV (US)

( * ) Notice: Subject to any disclaimer, the term of this patent is extended or adjusted under 35 U.S.C. 154(b) by 327 days.

This patent is subject to a terminal disclaimer.

(21) Appl. No.: 16/226,255

(22) Filed: Dec. 19, 2018

(65) Prior Publication Data

US 2019/0236733 A1 Aug. 1, 2019

Related U.S. Application Data

(63) Continuation of application No. 15/484,385, filed on Apr. 11, 2017, now Pat. No. 10,217,175, which is a continuation of application No. 13/941,111, filed on Jul. 12, 2013, now Pat. No. 9,659,334.

(51) Int. Cl.
  *G06Q 30/06* (2012.01)
  *G06Q 50/16* (2012.01)
  *G06Q 50/18* (2012.01)

(52) U.S. Cl.
  CPC ....... *G06Q 50/167* (2013.01); *G06Q 30/0611* (2013.01); *G06Q 30/0619* (2013.01); *G06Q 50/16* (2013.01); *G06Q 50/188* (2013.01)

(58) Field of Classification Search
  CPC .................................................... G06Q 30/06

USPC ................................................ 705/26.1–27.2
See application file for complete search history.

(56) References Cited

U.S. PATENT DOCUMENTS

| | | |
|---|---|---|
| 6,594,633 B1 | 7/2003 | Broerman |
| 7,333,943 B1 | 2/2008 | Charuk et al. |
| 7,353,183 B1 | 4/2008 | Musso |
| 7,548,884 B1 | 6/2009 | Thomas |

(Continued)

OTHER PUBLICATIONS

"Realty Plus Online Demonstrates Integration Technology at California Association of Realtors Expo." Business Wire Sep. 20, 2000: 0220. ProQuest.*

(Continued)

*Primary Examiner* — Jeffrey A. Smith
*Assistant Examiner* — Jennifer V Lee
(74) *Attorney, Agent, or Firm* — Howard & Howard Attorneys PLLC

(57) ABSTRACT

A system and method for facilitating real estate transactions that is configured for receiving property information from a listing service or data feed, presenting a property information display on data communication devices for each property; generating a unique transaction actuator in each property information display, and responsive to selecting a unique transaction actuator, generating an offer form with an offer transmittal actuator, wherein the offer form includes a plurality of data fields relating to an offer to purchase property that are populated with the property information for the specific property associated with the selected unique transaction actuator.

18 Claims, 2 Drawing Sheets

(56) References Cited

U.S. PATENT DOCUMENTS

| | | | |
|---|---|---|---|
| 7,680,673 | B2 | 3/2010 | Wheeler |
| 7,725,359 | B1* | 5/2010 | Katzfey ............. G06Q 30/0603 |
| | | | 705/26.1 |
| 7,818,219 | B2 | 10/2010 | Klivington et al. |
| 2004/0030631 | A1 | 2/2004 | Brown |
| 2006/0105342 | A1 | 5/2006 | Villena et al. |
| 2008/0313225 | A1* | 12/2008 | Spicer ................... G06F 16/955 |
| 2011/0276395 | A1* | 11/2011 | Gaton ................ G06Q 30/0613 |
| | | | 705/14.49 |
| 2012/0296863 | A1 | 11/2012 | Allison et al. |

OTHER PUBLICATIONS

"Real Estate & Mortgage Insights." RealEstate ABC. N.p., Aug. 2003. (http://www.realestateabc.com/insights/mls.htm).
Sahakian, Arvin. "The MLS (Multiple Listing Service): Past, Present and Future." BeSmartee. N.p., Sep. 9, 2015. (https://www.besmartee.com/blog/the-mls-multiple-listing-service-past-present-and-future).

* cited by examiner

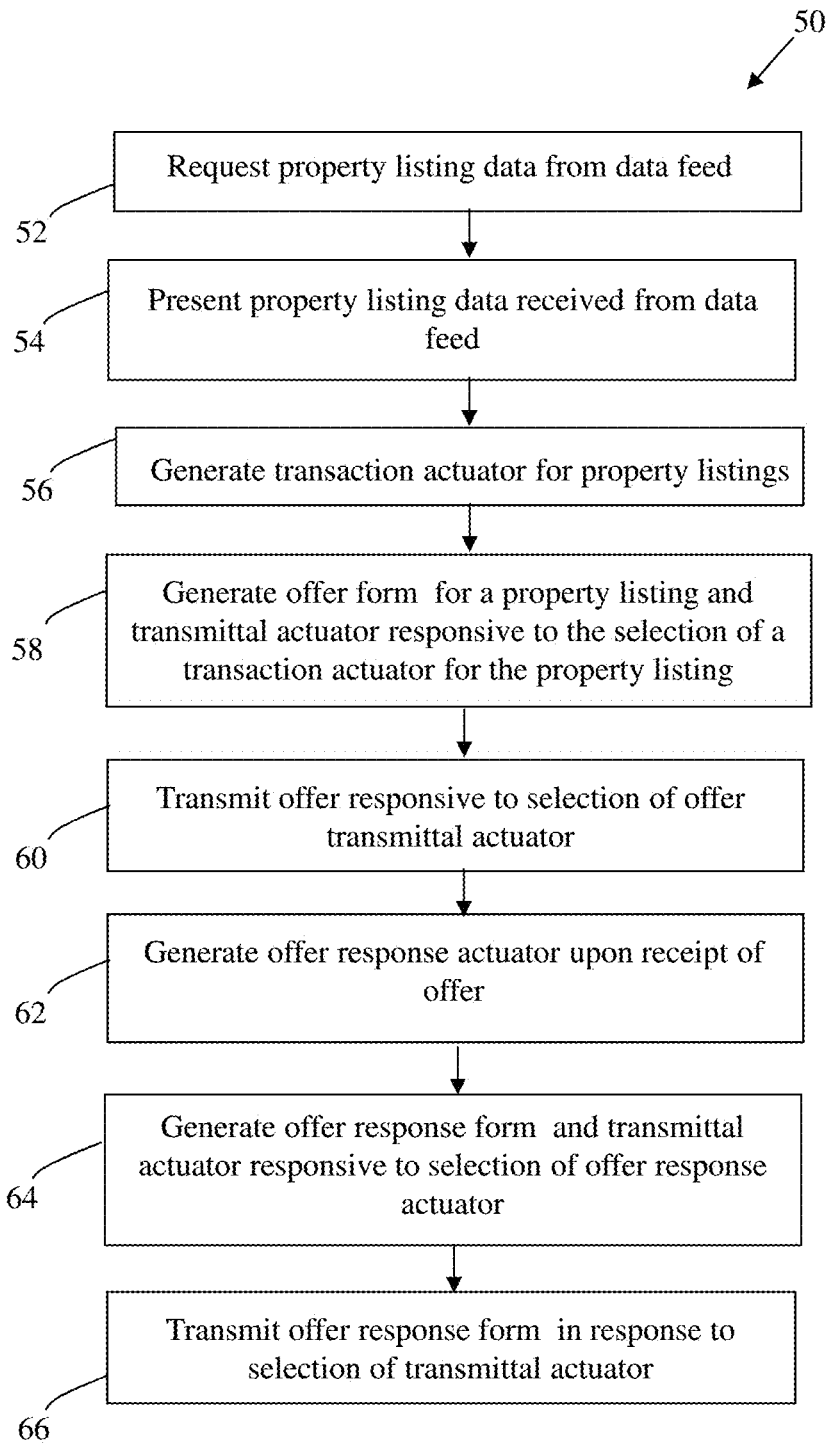

SYSTEMS AND METHODS FOR FACILITATING REAL ESTATE TRANSACTIONS WITH PURCHASE OFFER PROCESSING FEATURE

CROSS-REFERENCE TO RELATED APPLICATION

This application is a continuation of U.S. patent application Ser. No. 15/484,385, filed Apr. 11, 2017, which is a continuation of U.S. patent application Ser. No. 13/941,111, filed Jul. 12, 2013 (now U.S. Pat. No. 9,659,334, issued on May 23, 2017), the disclosures of which are hereby incorporated by reference in their entirety.

BACKGROUND OF THE INVENTION

Field of the Invention

The subject disclosure is generally directed to systems and methods for facilitating transactions between multiple parties, such as real estate transactions.

Background of the Related Art

Over many years there has been the development of multiple listing services (MLSs) that provide property listing aggregations for real estate brokers, agents, and other professionals in the real estate transaction chain that pay for membership. Each MLS generally consists of a database of residential, multifamily, commercial, and land real estate listings for the purpose of buying, selling or leasing those properties in a geographically specific market.

While the basic fields, such as lot size, list price, size of building, number of bedrooms, etc., are present in all MLSs, beyond the basic nature of the data collected by MLSs, their formatting varies widely, largely based on the historic preferences and development of the profession of each geographic market.

A standard for the transfer or exchange of property listing information, which is referred to as Real Estate Transaction Specification (RETS), has been developed by industry members over the last decade to address the formatting differences. The RETS is an XML standard that allows for the electronic interchange of listing information at the protocol level by, among other things, defining common basic fields.

While the MLSs remain a powerful tool which facilitates locating property to purchase, it does not facilitate the actual transaction or purchase of property between parties, which is still very much a non-automated and ad-hoc process.

For at least the foregoing reasons, there is a compelling need in the art for a real estate transaction management system and method that provides buyers, sellers and real estate professionals with the tools necessary to facilitate the purchase of property, and in particular, which facilitates the automated processing of purchase offers, counteroffers and acceptances, among other things.

SUMMARY OF THE INVENTION

Some embodiments of the invention provide a system and method for addressing the needs mentioned above, among other things.

Some embodiments of the invention are directed to systems and methods for facilitating real estate transactions, comprising the steps of: receiving property listing data through a first data communication device in communication with a source of property listing data, wherein the property listing data relates to one or more properties for sale and an offer receiving address; presenting a property information display on the first data communication device for each property; and generating a unique transaction actuator in each property information display presented on the first data communication device, wherein the unique transaction actuator is associated with the specific property presented on the first data communication device.

In some embodiments, the aforementioned method and system of the invention is configured to respond to selecting a unique transaction actuator by: generating an offer form with an offer transmittal actuator, wherein the offer form includes a plurality of data fields relating to an offer to purchase property; and populating the data fields with the property information for the specific property associated with the selected unique transaction actuator, wherein the offer form represents an offer to purchase the specific property and includes an offer transmitting address.

In some embodiments, the aforementioned system and method of the invention is configured to further respond to selecting the offer transmittal actuator by transmitting the populated offer form to the offer receiving address relating to the specific property; generating an offer response actuator for the populated offer form; and presenting the populated offer form and the offer response actuator on a second data communication device.

In some embodiments, the aforementioned system and method of the invention is configured to yet further respond to selecting the offer response actuator by: generating a response form, wherein the response form includes at least one data field for entering a response to the offer and a response transmittal actuator.

In some embodiments, the aforementioned system and method of the invention is configured to yet further respond to selecting the response transmittal actuator by transmitting the response form with the entered response to the offer transmitting address.

These and other aspects of the system and method of the subject invention and some embodiments thereof will become more readily apparent to those having ordinary skill in the art from the following detailed description of the invention and some embodiments thereof taken in conjunction with the drawings.

BRIEF DESCRIPTION OF THE FIGURES

So that those having ordinary skill in the art to which at least some embodiments of the invention pertains will more readily understand how to make and use systems and methods in accordance therewith, such embodiments thereof will be described in enabling detail herein below with reference to the drawings, wherein:

FIG. 2 is a flow diagram depicting operational steps employed by a system and method formed in accordance with some embodiments of the invention.

DETAILED DESCRIPTION OF THE INVENTION

Figure 1:
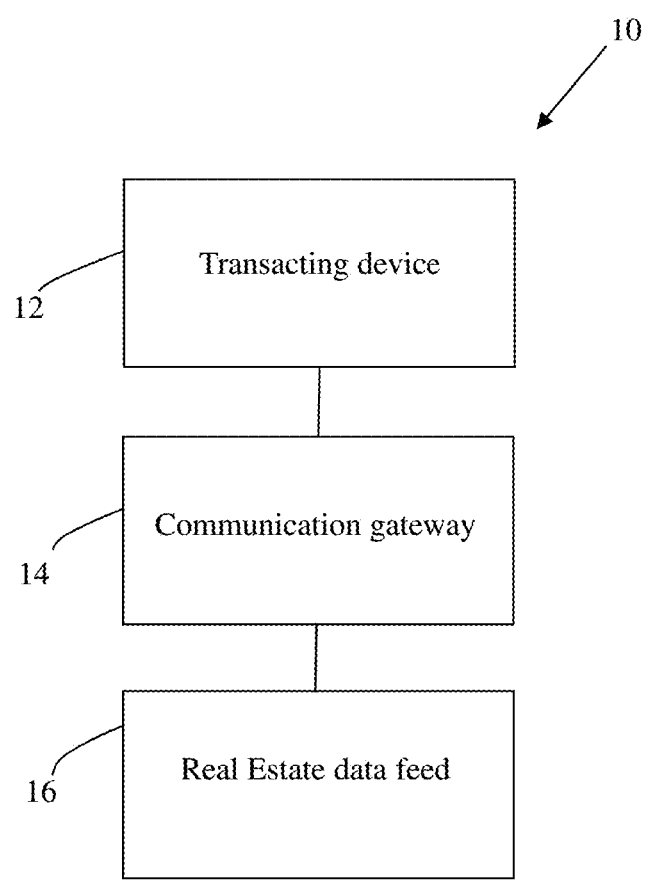
FIG. 1 illustrates a block diagram representative of an example electronic real estate transacting system in which certain embodiments may be employed.

The invention is generally related to systems and methods for facilitating transaction management electronically through access to an electronic transaction management platform which includes an offer and acceptance processing feature that provides offer submission, offer receipt, offer management, offer countering and offer amendment capabilities to transacting parties.

Much of the inventive functionality and many of the inventive principles are best implemented with or in software programs and instructions. It is expected that one of ordinary skill, notwithstanding possibly significant effort and many design choices motivated by, for example, available time, current technology, and economic considerations, when guided by the concepts and principles disclosed herein will be readily capable of generating such software instructions with minimal experimentation. Therefore, in the interest of brevity and minimization of any risk of obscuring the principles and concepts according to the present invention, further discussion of such software, if any, will be limited to the essentials with respect to the principles and concepts used by the preferred embodiments.

Some embodiments of the invention disclose a new and useful tool for facilitating real estate transactions and in particular the offer submission, acceptance, negotiation and processing of offers between parties. The data communication device may receive and populate the real estate listing data for which offers are to be submitted on, from any one or more sources, including real estate listing systems, computerized real estate listing systems or an entity such as the multiple listing service (MLS) or any aggregator of MLS listing data. The data feed from the MLS may be sent to the data communication device in any format, including, but not limited to, RETS, Internet Data Exchange (IDX), File Transfer Protocol (FTP), Extensible Markup Language (XML), or any other data feed format. The listing data feed, regardless of the initial format of the feed, may be modified as necessary to populate and display the data to a user through a connection with a data communication device.

While the embodiments discussed herein provide systems and methods for facilitating offer and acceptance processing for real estate transactions, it should be understood that this is a non-limiting, exemplary embodiment of a system and method of the invention. The systems and methods of the invention may be used in connection with transactions involving other subject matter, including any items or services which may be sold or involved in a transaction.

Those skilled in the art will readily appreciate that a system in accordance with some embodiments of the invention may include various computer and network related software and hardware, that is, programs, operating systems, memory storage devices, data input/output devices, data processors, servers with links to data communication systems, wireless or otherwise, such as those which take the form of a local or wide area network, and a plurality of data transceiving terminals capable of interfacing with the network, such as personal computers, handheld devices, personal digital assistants (PDAs), cell phones or any other devices capable of displaying a graphical user interface.

Those skilled in the art will further appreciate that the particular types of communication network and devices, software and hardware are not vital to the full implementation of the embodiments described herein or other embodiments within the scope and spirit of the invention. It should be understood that the type of communication network and devices, software and hardware may also vary based on the rapid advances in technology that are ongoing in the industry. In other words, the precise software and hardware configuration of the various embodiments of the invention may vary accordingly while still remaining within the scope and spirit of the invention.

Although the description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways. Furthermore, well known process steps and computer components may have not been described in detail herein in order to avoid unnecessarily obscuring the underlying concepts.

FIG. 1 illustrates a block diagram representative of an example electronic real estate transaction management system 10 in which certain embodiments may be employed. System 10 includes a transacting device 12, a gateway 14, and an electronic real estate market feed 16, which may comprise a database, or any data feed containing real estate listing data such as those described herein, including the RETS, IDX, FTP and XML data feeds. Transacting device 12 is in communication with the communication gateway 14. Gateway 14 is in communication with the electronic real estate market feed 16 in order to extract or obtain the real estate listing data.

As used herein, the phrase "in communication" encompasses direct communication and/or indirect communication through one or more intermediary components. The exemplary electronic system 10 depicted in FIG. 1 may be in communication with additional components, subsystems, and elements to provide additional functionality and capabilities without departing from the teaching and disclosure provided herein.

In operation, the transacting device 12 may receive real estate listing data from the electronic real estate market feed 16 through the communication gateway 14 for one or more properties for sale. The real estate listing data may include a variety of pictures and information about the property for sale and its contact person or transacting party, such as the owner, real estate professional, broker or agent involved in the listing, the type of property, history of the property, school district, city, county, state, zip code, mailing address, seller information, and current status. In some embodiments, the listings data provided to transacting device 12 from market feed 16 will be updated upon request or periodically in order to provide the most current information about properties for sale and remove properties which are no longer for sale on the electronic market.

Market feed 16 may contain listing data in more than one format, which may occur because market feed 16 includes data from more than one source, MLS or data feed. In some embodiments, system 10 is configured to automatically map the listing information obtained from market feed 16 to a preset format for presentation on transacting device 12.

A user may utilize the transacting device 12 to search and review real estate listings of properties currently available on the electronic market. Users may further utilize transacting device 12 to submit an offer to purchase one or more of the properties for sale. In some embodiments, the offer to purchase includes mapping the listing data for the property involved in the offer to a preset offer form which may then be transmitted through gateway 14 to the transacting device 12, electronic real estate market feed 16 and/or a contact person for the listing.

The contact person or people for the listing may be notified of the offer and receive the offer through another transacting device 12 in communication with communication gateway 14. The contact person may then respond to the offer through communication with gateway 14 by, for example, requesting clarification or an amendment, indicating acceptance of the offer, declining the offer and presenting a counteroffer, all of which can be transmitted through gateway 14 to the transacting device 12 of the user who transmitted the offer.

Transacting device 12 may include one or more electronic computing platforms. For example, transacting device 12 may include a desktop computer, hand-held device, laptop, server, a portable computing device, or a terminal, which may include a display and be in communication with a server. As another example, the transacting device 12 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

Transacting device 12 may include one or more transacting applications which facilitates or improves electronic real estate transaction management. These transacting applications may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a transacting application may be loaded into the computer readable medium of the transacting device 12 from another computer readable medium. For example, the transacting application (or updates thereto) may be stored by a manufacturer, developer, or publisher on one or more CDs or DVDs, which are then loaded onto the transacting device 12 or to a server from which device 12 retrieves the application. As another example, the transacting device 12 may receive the transacting application (or updates to the transacting application) from a server, for example, via the Internet or an internal network. The transacting device 12 may receive the transacting application or updates when requested by the transacting device 12 and/or un-requested by the transacting device 12.

The gateway 14 may include one or more electronic computing platforms. For example, the gateway 14 may be implemented as one or more desktop computer, hand-held device, laptop, server, a portable computing device, a terminal, a workstation with a single or multi-core processor, cluster of computers, databases, servers, or any combination thereof.

Gateway 14 may facilitate communication. For example, the gateway 14 may perform protocol translation for data communicated between the transacting device 12 and the market 16. For example, the gateway 14 may transform property listing data in a market-specific format received from the market feed 16 into a single format which is best understood by the transacting device 12.

Gateway 14 may include a transacting application, similar to the transacting applications discussed above, that facilitates or improves electronic real estate transaction management and offer and acceptance processing. In some embodiments, gateway 14 communicates with the market feed 16 using a local area network, a wide area network, a virtual private network, a T1 line, a T3 line, an ISDN line, a point-of-presence, the Internet, and/or a shared memory system, for example. It should be understood that communication with market feed 16 may require the entry and approval of proper credentials, such as username and password.

In some embodiments, transacting device 12 and gateway 14 are mounted together in a unitary housing, while in other embodiments they are separate and remotely positioned components.

Electronic real estate market feed 16 may include any electronic real estate listing system or data feed from one or more computers, servers, or other computing devices, which is continually being updated by multiple users. Market feed 16 is typically in communication with a variety of other transacting devices, which may be similar to transacting device 12.

Property data from market feed 16 may be provided in one or more messages or data packets or through a shared memory system. For example, the market feed 16 may publish a data feed to subscribing devices, such as the transacting device 12 or gateway 14. The data feed may include property data.

System 10 may include additional, different, or fewer components. For example, system 10 may include multiple transacting devices, gateways, and/or markets. In another example, system 10 may include other communication devices, such as middleware, firewalls, hubs, switches, routers, servers, exchange-specific communication equipment, modems, security managers, and/or encryption/decryption devices.

As mentioned above, with the continuous and ongoing improvements in computer and electronic technology, many modifications may be made to the specific nature of hardware and/or software components required. Accordingly, one of skill in the art may select any hardware components that would rapidly and efficiently process the data and provide storage and communication as needed for the successful operation of some embodiments of the invention.

FIG. 2 provides a process flow diagram which illustrates operational steps employed by an exemplary embodiment of the method of the invention referred to as method 50. For illustrative purposes and convenience, the process steps will be described in conjunction with the exemplary system embodied by system 10 as shown in FIG. 1.

It should be understood that graphical user interfaces may be employed by embodiments disclosed herein for display on a transacting device 12 that may incorporate user-friendly features and fit seamlessly with other operating system interfaces, that is, in a framed form having borders, multiple folders, toolbars with drop or pull-down menus, embedded links to other screens and various other selectable features associated with animated graphical representations of depressible buttons. These features can be selected (i.e., "clicked on") by the user via connected mouse, keyboard, touch screen or other commonly used tool for indicating a preference in a computerized graphical interface.

In some embodiments, step 52 involves a user requesting property listing data through a transacting device 12 which communicates with electronic market 16 through gateway 14 to obtain the requested property data. It should be understood that in some gateway 14 may be configured to request updated data for one or more particular markets or areas on a regular basis, such as daily, so that users are initially provided with updated data, though further requests from market 16 are also enabled.

In step 54, the requested property listing data is received from a data feed or other source and presented on a transacting device 12. The property listing data for each property is mapped to data fields for presentation in a preset universal format display through transacting device 12. The data fields may include a variety of information about the property and an address, such as an email address, for receiving requests for further information about the property or receiving offers to purchase the property.

In step 56, a unique transaction actuator is generated for each property and made accessible in connection with the property information display. A user may select to make an offer on a specific property by selecting or clicking on the transaction actuator through transacting device 12. The transaction actuator may be a hyperlink and represented by a symbol and/or text.

In step 58, responsive to selecting a transaction actuator associated with a specific property, an offer form is either automatically populated with all of the property data relating to the specific property selected, partially populated with the remaining manually entered or all of the information is manually entered. One or more data fields may be provided for a user to enter information into the offer form, such as the monetary amount of the offer and an offer transmitting address, such as an email address. Offer terms may also be made selectable from various options on the offer form by providing indicators or checkboxes that may be checked to indicate selections from various options. In some embodiments, the offer form is automatically transmitted to the offer receiving address. In this embodiment, an offer transmittal actuator is generated as part of the offer form which must be selected for the offer to be transmitted to the offer receiving address associated with the property. A cancel button may also be provided to cancel the offer.

In step 60, responsive to the offer transmittal actuator being selected, the offer is transmitted through gateway 14 to the offer receiving address associated with the subject property involved in the offer.

In some embodiments, the contact person for the property is notified or otherwise receives information regarding the offer through gateway 14 using another transacting device 12, which may require the entry and approval of credentials, such as a username and password.

In step 62, the offer is received and may be viewed through a transacting device 12 in communication with gateway 14. An offer response actuator is generated and also displayed along with the offer through the transacting device 12.

In step 64, responsive to selecting the offer response actuator, a response form and response transmittal actuator are generated. The response may include a data field for data entry and/or selectable indicators, such as checkboxes, for selecting various responses to the offer, such as acceptance of the offer, a request for amendment of the terms of the offer, a counteroffer or a rejection of the offer, for example.

In step 66, the response is transmitted to the offer transmitting address responsive to the response transmittal actuator being selected and may be viewed through a transacting device, which may also require the entry and approval of proper credentials.

If the response is acceptance then the real estate transaction is ready to move forward towards fruition. If the response is a counteroffer, then the transacting party responsible for the original offer may now provide a response to the counteroffer in the same manner as above.

It will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. Various features and advantages of the disclosure are set forth in the following claims.

What is claimed is:

1. A computer-implemented method for generating and transmitting information related to real estate offers, comprising the steps of:

retrieving, by a gateway server, a first plurality of property display records being stored in a database, each of the first plurality of property display records being associated with a particular real estate property for sale and each including a first set of property information organized into first preset category data fields, wherein the first set of property information includes an associated listing email address;

transmitting, by the gateway server, a property listing data request to a plurality of Multiple Listing Services at predefined time intervals, wherein each of the plurality of Multiple Listing Services includes a data feed;

receiving, by the gateway server, property listing data from each of the data feeds in response to the property listing data request, wherein the property listing data from each of the data feeds includes a second plurality of property display records including a second set of property information organized into second category data fields;

determining, by the gateway server, a first property display record from the first plurality of property display records corresponds with a second property display record from the second plurality of property display records;

mapping, by the gateway server, the second category data fields in the second property display record with corresponding first preset category data fields in the first property display record, wherein a property information in at least one first preset category data field in the first property display record and a property information in at least one corresponding second category data field are formatted differently;

modifying, by the gateway server, a format of the property information in the at least one corresponding second category data field to the same format as the property information in the at least one first preset category data field;

updating, by the gateway server, the first set of property information in the first property display record to incorporate the second set of property information from the corresponding second property display record, including incorporating the property information from the at least one corresponding second category data field in the modified format to the property information in the at least one first preset category data field;

generating, by the gateway server, a corresponding unique transaction actuator for each of the first plurality of property display records, each corresponding unique transaction actuator including a hyperlink with computer-implemented instructions for generating a corresponding offer form, wherein the first plurality of property display records includes the updated first property display record;

receiving, by the gateway server, a signal including a property listing request from a first data communication device associated with a buyer or buyer's agent to display information indicative of the real estate properties for sale and responsively display a webpage for displaying the information indicative of the real estate properties for sale on the first data communication device;

receiving, by the gateway server, a property search request from the buyer or buyer's agent via the first data communication device and displaying a property information display on the first data communication device including a corresponding unique transaction actuator in response to the received property search request;

receiving, by the gateway server from the first data communication device, a first signal indicating a selection of the displayed corresponding unique transaction actuator by the buyer or buyer's agent via the first data communication device;

responsive to receiving the first signal:

accessing the database and selecting, by the gateway server, a property display record from the first plurality of property display records associated with the corresponding unique transaction actuator based on the computer-implemented instructions included in the selected corresponding unique transaction actuator;

creating, by the gateway server, an offer form associated with the selected property display record including generating a plurality of data fields relating to an offer to purchase the particular real estate property associated with the selected property display record;

automatically populating the plurality of data fields relating to the offer, by the gateway server, including retrieving the first set of property information included in the selected property display record and mapping the retrieved first set of property information included in the selected property display record onto the plurality of data fields;

generating, by the gateway server, an offer transmittal actuator including a hyperlink with computer-implemented instructions to transmit a notification of the offer to an associated listing email address included in the retrieved first set of property information;

transmitting, by the gateway server, the populated offer form and the generated offer transmittal actuator to the first data communication device; and rendering, by the gateway server, a webpage including the populated offer form including the offer transmittal actuator on the first data communication device, wherein the populated offer form represents the offer to purchase the particular real estate property associated with the selected property display record and includes an offer transmitting address associated with the buyer or buyer's agent.

2. The method according to claim 1, including the steps of:

receiving, by the gateway server, a second signal indicating a selection of the offer transmittal actuator by the buyer or buyer's agent via the first data communication device;

responsive to receiving the second signal:

identifying, by the gateway server, an associated listing email address associated with the selected property display record and transmitting an email communication to the identified associated listing email address notifying a corresponding listing agent of the offer to purchase the particular real estate property associated with the selected property display record;

receiving, by the gateway server, a request to display the populated offer form from the corresponding listing agent via a second data communication device and prompting the listing agent to provide a username and password to access the populated offer form;

transmitting, by gateway server, the populated offer form to the second data communication device upon receiving the username and password;

generating an offer response actuator for the populated offer form; and rendering the populated offer form and the offer response actuator on the second data communication device associated with the listing agent.

3. The method of claim 2, including the steps of:

receiving, by the gateway server, a third signal indicating a selection of the offer response actuator by the listing agent via the second data communication device;

responsive to receiving the third signal, generating a response form, wherein the response form includes a data field, a plurality of selectable response indicators, and a response transmittal actuator, each of the plurality of selectable response indicators corresponding to a response to the offer including an acceptance of the offer, a request for amendment, a counteroffer, and a rejection of the offer, the response transmittal actuator including a hyperlink including computer-implemented instructions to transmit the response form to an offer transmitting email address associated with the buyer or buyer's agent; and receiving a fourth signal indicating a selection of one of the selectable response indicators and the response transmittal actuator by the listing agent via the second data communication device;

responsive to receiving the fourth signal, creating, by the gateway server, a response form responding to the offer based on the selected response indicator and transmitting the created response form with the selected response corresponding to the selected response indicator to the offer transmitting address.

4. The method in accordance with claim 3, wherein the response to the offer includes a counteroffer, the method includes the step of allowing the listing agent to modify the received populated offer form to generate the counteroffer.

5. The method in accordance with claim 4, including the step of allowing the buyer or buyer's agent to modify the populated offer form upon receiving the counteroffer.

6. The method in accordance with claim 3, wherein the gateway server generates the response form including a pull-down menu including the plurality of selectable response indicators.

7. The method according to claim 1, wherein the first preset category data fields include at least one of a contact person, a MLS number, a broker, an agent, a property type, a school district, a city, a county, a state, a zip code, a property address, seller information, and a current status.

8. The method in accordance with claim 1, the plurality of Multiple Listing Services includes a first MLS associated with a different geographic region than a second MLS.

9. The method in accordance with claim 1, wherein the plurality of Multiple Listing Services includes an aggregator of MLS listing data.

10. A computer network system for generating and transmitting information related to real estate offers, comprising a plurality of data communication devices coupled to a gateway server, the gateway server including one or more processing devices programmed to perform the steps of:

retrieving a first plurality of property display records being stored in a database, each of the first plurality of property display records being associated with a particular real estate property for sale and each including a first set of property information organized into first preset category data fields, wherein the first set of property information includes an associated listing email address;

transmitting a property listing data request to a plurality of Multiple Listing Services at predefined time intervals, wherein each of the plurality of Multiple Listing Services includes a data feed;

receiving property listing data from each of the data feeds in response to the property listing data request, wherein the property listing data from each of the data feeds includes a second plurality of property display records including a second set of property information organized into second category data fields;

determining a first property display record from the first plurality of property display records corresponds with a second property display record from the second plurality of property display records;

mapping the second category data fields in the second property display record with corresponding first preset category data fields in the first property display record, wherein a property information in at least one first preset category data field in the first property display record and a property information in at least one corresponding second category data field are formatted differently;

modifying a format of the property information in the at least one corresponding second category data field to the same format as the property information in the at least one first preset category data field;

updating the first set of property information the first property display record to incorporate the second set of property information from the corresponding second property display record, including incorporating the property information from the at least one corresponding second category data field in the modified format to the property information in the at least one first preset category data field;

generating a corresponding unique transaction actuator for each of the first plurality of property display records, each corresponding unique transaction actuator including a hyperlink with computer-implemented instructions for generating a corresponding offer form, wherein the first plurality of property display records includes the updated first property display record;

receiving a signal including a property listing request from a first data communication device associated with a buyer or buyer's agent to display information indicative of the real estate properties for sale and responsively display a webpage for displaying the information indicative of the real estate properties for sale on the first data communication device;

receiving a property search request from the buyer or buyer's agent via the first data communication device and displaying a property information display on the first data communication device including a corresponding unique transaction actuator in response to the received property search request;

receiving a first signal indicating a selection of the displayed corresponding unique transaction actuator by the buyer or buyer's agent via the first data communication device;

responsive to receiving the first signal:

accessing the database and selecting a property display record from the first plurality of property display records associated with the corresponding unique transaction actuator based on the computer-implemented instructions included in the selected corresponding unique transaction actuator;

creating an offer form associated with the selected property display record including generating a plurality of data fields relating to an offer to purchase the particular real estate property associated with the selected property display record;

automatically populating the plurality of data fields relating to the offer, by the gateway server, including retrieving the first set of property information included in the selected property display record and mapping the retrieved first set of property information included in the selected property display record onto the plurality of data fields;

generating an offer transmittal actuator including a hyperlink with computer-implemented instructions to transmit a notification of the offer to an associated listing email address included in the retrieved first set of property information;

transmitting the populated offer form and the generated offer transmittal actuator to the first data communication device; and rendering a webpage including the populated offer form including the offer transmittal actuator on the first data communication device, wherein the populated offer form represents the offer to purchase the particular real estate property associated with the selected property display record and includes an offer transmitting address associated with the buyer or buyer's agent.

11. The system in accordance with claim 10, wherein the gateway server is further programmed to perform the steps of:

receiving a second signal indicating a selection of the offer transmittal actuator by the buyer or buyer's agent via the first data communication device;

responsive to receiving the second signal:

identifying an associated listing email address associated with the selected property display record and transmitting an email communication to the identified associated listing email address notifying a corresponding listing agent of the offer to purchase the particular real estate property associated with the selected property display record;

receiving a request to display the populated offer form from the corresponding listing agent via a second data communication device and prompting the listing agent to provide a username and password to access the populated offer form;

transmitting the populated offer form to the second data communication device upon receiving the username and password;

generating an offer response actuator for the populated offer form; and rendering the populated offer form and the offer response actuator on a second data communication device associated with the listing agent.

12. The system in accordance with claim 11, wherein the gateway server is further programmed to perform the steps of:
   receiving a third signal indicating a selection of the offer response actuator by the listing agent via the second data communication device;
   responsive to receiving the third signal, generating a response form, wherein the response form includes a data field, a plurality of selectable indicators, and a response transmittal actuator, each of the plurality of selectable response indicators corresponding to a response to the offer including an acceptance of the offer, a request for amendment, a counteroffer, and a rejection of the offer, the response transmittal actuator including a hyperlink including computer-implemented instructions to transmit the response form to an offer transmitting email address associated with the buyer or buyer's agent; and
   receiving a fourth signal indicating a selection of one of the selectable response indicators and the response transmittal actuator by the listing agent via the second data communication device;
   responsive to receiving the fourth signal, creating, by the gateway server, a response form responding to the offer based on the selected response indicator and transmitting the created response form with the selected response corresponding to the selected response indicator to the offer transmitting address.

13. The system in accordance with claim 12, wherein the response to the offer includes a counteroffer, the gateway server is further programmed to allow the listing agent to modify the received populated offer form to generate the counteroffer.

14. The system in accordance with claim 13, wherein the gateway server is further programmed to allow the buyer or buyer's agent to modify the populated offer form upon receiving the counteroffer.

15. The system in accordance with claim 12, the gateway server configured to generate the response form including a pull-down menu including the plurality of selectable response indicators.

16. The system in accordance with claim 10, wherein the first preset category data fields including at least one of a contact person, a MLS number, a broker, an agent, a property type, a school district, a city, a county, a state, a zip code, a property address, seller information, and a current status.

17. The system in accordance with claim 10, wherein the plurality of Multiple Listing Services includes an aggregator of MLS listing data.

18. A non-transitory computer-readable storage medium storing computer-executable instructions, which when executed by a processor, cause the processor to generate and transmit information related to real estate offers by performing the algorithm steps of:
   retrieving, by a gateway server, a first plurality of property display records being stored in a database, each of the first plurality of property display records being associated with a particular real estate property for sale and each including a first set of property information organized into first preset category data fields, wherein the first set of property information includes an associated listing email address;
   transmitting, by the gateway server, a property listing data request to a plurality of Multiple Listing Services at predefined time intervals, wherein each of the plurality of Multiple Listing Services includes a data feed;
   receiving, by the gateway server, property listing data from each of the data feeds in response to the property listing data request, wherein the property listing data from each of the data feeds includes a second plurality of property display records including a second set of property information organized into second category data fields;
   determining, by the gateway server, a first property display record from the first plurality of property display records corresponds with a second property display record from the second plurality of property display records;
   mapping, by the gateway server, the second category data fields in the second property display record with corresponding first preset category data fields in the first property display record, wherein a property information in at least one first preset category data field in the first property display record and a property information in at least one corresponding second category data field are formatted differently;
   modifying, by the gateway server, a format of the property information in the at least one corresponding second category data field to the same format as the property information in the at least one first preset category data field;
   updating, by the gateway server, the first set of property information in the first property display record to incorporate the second set of property information from the corresponding second property display record, including incorporating the property information from the at least one corresponding second category data field in the modified format to the property information in the at least one first preset category data field;
   generating, by the gateway server, a corresponding unique transaction actuator for each of the first plurality of property display records, each corresponding unique transaction actuator including a hyperlink with computer-implemented instructions for generating a corresponding offer form, wherein the first plurality of property display records includes the updated first property display record;
   receiving, by the gateway server, a signal including a property listing request from a first data communication device associated with a buyer or buyer's agent to display information indicative of the real estate properties for sale and responsively display a webpage for displaying the information indicative of the real estate properties for sale on the first data communication device;
   receiving, by the gateway server, a property search request from the buyer or buyer's agent via the first data communication device and displaying a property information display on the first data communication device including a corresponding unique transaction actuator in response to the received property search request;
   receiving, by the gateway server from the first data communication device, a first signal indicating a selection of the displayed corresponding unique transaction actuator by the buyer or buyer's agent via the first data communication device;
   responsive to receiving the first signal:
   accessing the database and selecting, by the gateway server, a property display record from the first plurality of property display records associated with the corresponding unique transaction actuator based on the computer-implemented instructions included in the selected corresponding unique transaction actuator;

creating, by the gateway server, an offer form associated with the selected property display record including generating a plurality of data fields relating to an offer to purchase the particular real estate property associated with the selected property display record;

automatically populating the plurality of data fields relating to the offer, by the gateway server, including retrieving the first set of property information included in the selected property display record and mapping the retrieved first set of property information included in the selected property display record onto the plurality of data fields;

generating, by the gateway server, an offer transmittal actuator including a hyperlink with computer-implemented instructions to transmit a notification of the offer to an associated listing email address included in the retrieved first set of property information;

transmitting, by the gateway server, the populated offer form and the generated offer transmittal actuator to the first data communication device; and rendering, by the gateway server, a webpage including the populated offer form including the offer transmittal actuator on the first data communication device, wherein the populated offer form represents the offer to purchase the particular real estate property associated with the selected property display record and includes an offer transmitting address associated with the buyer or buyer's agent.

* * * * *